J. C. KNAPP.
PLUMB OR LEVEL DEVICE.
APPLICATION FILED AUG. 13, 1920.
1,373,336.
Patented Mar. 29, 1921.
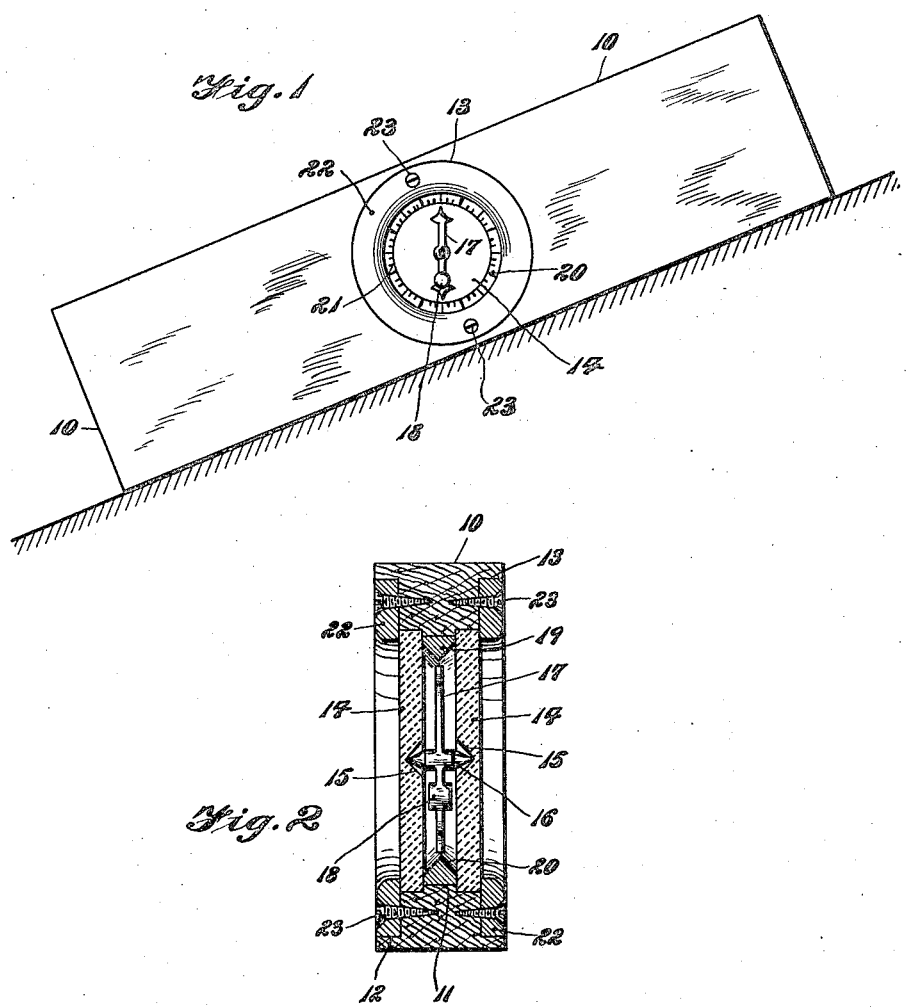

UNITED STATES PATENT OFFICE.

JOHN C. KNAPP, OF PHILADELPHIA, PENNSYLVANIA.

PLUMB OR LEVEL DEVICE.

1,373,336.                      Specification of Letters Patent.       Patented Mar. 29, 1921.

Application filed August 13, 1920. Serial No. 403,344.

*To all whom it may concern:*

Be it known that I, JOHN C. KNAPP, a citizen of the United States, residing at Philadelphia, in the county of Philadelphia and State of Pennsylvania, have invented new and useful Improvements in Plumb or Level Devices, of which the following is a specification.

An object of the invention is to provide a device for readily ascertaining the plumb or level of a surface or the like or any degree of angularity thereof.

Among other features the invention comprehends an instrument of a simple construction, consisting of few and simple parts that cannot readily get out of order and in which the indicator, indicating the degree of angularity of a surface, is of a visible nature and so mounted and arranged that it will accurately indicate the particular angle or degree of angularity of the surface, or whether the surface is in a horizontal or vertical plane.

In the further disclosure of the invention, reference is to be had to the accompanying drawings, constituting a part of this specification, in which similar characters of reference denote corresponding parts in all the views, and in which,—

Figure 1—is an elevation of the device showing the same applied to an angular surface, and Fig. 2—is a vertical cross sectional view taken through the device.

Referring more particularly to the views, the numeral 10 indicates a body or frame which may consist of a rectangular piece of wood provided at its central portion with an opening 11 and opposed sets of cut out portions 12, 13, of a circular nature. Disposed in the cut out portions 12 are transparent circular disks 14 preferably made of glass and which are in the nature of faces, each disk having its central portion ground out to form a ground bearing 15 for receiving the ends of a central pivot or pin 16 extending through and constituting a part of an indicator 17 in the nature of an arrow, the tail end of the indicator carrying a suitable weight 18. The ends of the pivot or pins 16 are of course tapered and preferably made of a very hard material such as a fine grade of steel and interposed between the disks 14 to lie in the opening 11, is a ring-like dial 19, the sides 20 of which converge as shown in Fig. 2 and are provided with or marked off in degrees 21. It will of course be understood that the dial may be marked off in any number of degrees and the markings may also be formed or treated with a luminous paint so that it can be readily discerned in dark places and so also the indicator may be coated with a luminous paint if desired. In order to secure the disks in place and provide a rigid structure, there are provided a plurality of opposed securing rings or members 22 disposed in the sets of cut out portions 13 and over-lapping the disks to hold the disks in position and also serve to secure the dial, suitable screws 23 or other fastening devices being provided to pass through the rings into the wood or material of the frame or body 10.

With this construction it will be seen that there is provided an instrument in which the delicately mounted indicator will be protected by the transparent disks which support it for its pivotal movement and that the indicator can be readily seen from either side of the body, furthermore enabling the user to readily determine the degree of angularity or the plumb or level of a surface upon which the instrument is placed so that the number of degrees or fractional degrees of angularity from the horizontal or vertical, can be readily determined. By having the cut out portions 13, the securing rings 22 will not project beyond the faces of the body and will also serve as a protection for the glass or transparent disks. It will be apparent that a device of the character described embodies various advantages over the usual spirit levels or plumb-bobs or levels which are not only oft-times inaccurate, but also become very readily broken and furthermore because of the manner in which they are usually arranged in the frames, cannot be readily read and particular angularity of the surface accurately determined.

Although it will be understood that I have shown a particular form of my invention and described particular features thereof, it will be apparent that various slight changes may be made without departing from the spirit of the invention, the scope of which is defined in the appended claim.

Having described my invention, I claim—

A device of the character described comprising a body provided with an opening, a circular dial set in the said opening, a plurality of opposed transparent disks arranged on each side of the dial and formed with centrally cut out bearing surfaces, a weighted indicator mounted to rotate between said disks on the bearing surfaces thereof and a plurality of opposed securing rings set into the said body to bear against the disks, securing them rigidly in position and holding the dial in interposed position between the disks.

In testimony whereof I affix my signature.

JOHN C. KNAPP.